US007271992B2

(12) United States Patent
Wittmann et al.

(10) Patent No.: US 7,271,992 B2
(45) Date of Patent: Sep. 18, 2007

(54) COMPACT ARRANGEMENT FOR MULTIPOLE, SURGE-PROOF SURGE ARRESTERS AND ENCAPSULATED SURGE ARRESTER FOR THE SAME

(75) Inventors: Georg Wittmann, Lauterhofen (DE); Edmund Zaeuner, Berching/Pollanten (DE); Peter Zahlmann, Neumarkt (DE); Arnd Erhardt, Neumarkt (DE); Bernhard Krauss, Berg/Unterrohrenstadt (DE); Michael Waffler, Neumarkt (DE); Stefan Hierl, Neumarkt (DE)

(73) Assignee: Dehn + Soehne GmbH + Co. KG, Neumarkt/Opf. (DE)

( * ) Notice: Subject to any disclaimer, the term of this patent is extended or adjusted under 35 U.S.C. 154(b) by 718 days.

(21) Appl. No.: 10/416,531

(22) PCT Filed: Nov. 27, 2001

(86) PCT No.: PCT/EP01/13775

§ 371 (c)(1),
(2), (4) Date: May 27, 2003

(87) PCT Pub. No.: WO02/45224

PCT Pub. Date: Jun. 6, 2002

(65) Prior Publication Data

US 2004/0160723 A1 Aug. 19, 2004

(30) Foreign Application Priority Data

| | | |
|---|---|---|
| Nov. 28, 2000 | (DE) | 100 58 977 |
| Mar. 13, 2001 | (DE) | 101 11 954 |
| Apr. 11, 2001 | (DE) | 101 18 210 |
| May 29, 2001 | (DE) | 101 25 941 |

(51) Int. Cl.
*H02H 9/00* (2006.01)

(52) U.S. Cl. .......... 361/129

(58) Field of Classification Search .......... 361/118, 361/129

See application file for complete search history.

(56) References Cited

U.S. PATENT DOCUMENTS

| | | | | |
|---|---|---|---|---|
| 4,475,066 | A | 10/1984 | Lee | 315/344 |
| 4,631,453 | A * | 12/1986 | DeSouza et al. | 315/340 |
| 5,936,824 | A * | 8/1999 | Carpenter, Jr. | 361/126 |

FOREIGN PATENT DOCUMENTS

| | | |
|---|---|---|
| CH | 679 715 | 3/1992 |
| CH | 690 480 | 9/2000 |
| GB | 2 203 286 | 10/1988 |
| WO | 98 26480 | 6/1998 |

* cited by examiner

*Primary Examiner*—Stephen W. Jackson
(74) *Attorney, Agent, or Firm*—Oblon, Spivak, McClelland, Maier & Neustadt, P.C.

(57) ABSTRACT

A compact arrangement for multipole, surge-protected surge arresters, including internally wired, encapsulated series gaps arranged essentially in parallel in a housing. The series gaps have opposite-lying, projecting contact surfaces connected to outer terminals and inner contact bars or bridges. An electronic control or trigger circuit is located on a wiring support. The housing includes dividing walls and has a trough shape, the resulting housing chambers accommodating the gaps and terminals. An insulating plate with openings into which spring contact elements are introduced is provided on the housing trough which opens upwards. Located above the insulating plate is the wiring. The spring contact elements create the electrical connection between contact points on the underside of the wiring support and the cover of one of the series gaps, respectively. Further, an encapsulated surge protector includes a series gap arrangement with two metallic main electrodes lying coaxially to each other and at least partially overlapping each other and having connections in opposite directions. The main electrodes form an arc chamber in conjunction with at least one insulation part. At least one of the main electrodes has an inner expansion chamber and a trigger electrode extending preferably radially or axially rotationally symmetrically is provided at least in the area of an outer insulation part.

36 Claims, 9 Drawing Sheets

COMPACT ARRANGEMENT FOR MULTIPOLE, SURGE-PROOF SURGE ARRESTERS AND ENCAPSULATED SURGE ARRESTER FOR THE SAME

The invention relates to a compact arrangement for multipole, surge-proof surge arresters, comprising internally wired, encapsulated spark gaps which are arranged essentially in parallel in a housing, the gaps having facing projecting contact surfaces connected to outer terminals and inner contact bars or bridges, and also comprising an electronic control or trigger circuit present on a wiring support, according to the preamble of claim 1, and an encapsulated surge arrester, in particular for use in such a compact arrangement, according to the preamble of claim 19.

Multipole surge arresters are known which are surge-proof up to 100 kA and which contain, although not in a 3+1 circuit, a plurality of encapsulated spark gaps.

In a so-called 3+1 circuit, the outer conductors L1, L2, L3 are connected to N, and the N-conductor is in turn connected to PE. Thus, in such embodiments of multipole surge arresters in one housing, a change of the internal wiring plane is required when all of the conductors (L1, L2, L3 and N) are to be connected from one side.

If such internal wiring is formed by an additional bridge, at least two more screw or weld connections are necessary for electrically bonding. Due to the fact that such a bridge is exposed to a very high mechanical load at the mentioned possible surges of up to a range of about 100 kA, the corresponding dimensional and mechanical configuration must be provided.

A further problem with multipole arresters alternating wiring planes is that as far as possible no additional space for the bridge itself should be taken up, so that the outer dimensions of the housing are not changed or so that standard housings also suited for other applications may be used.

Likewise for reasons of space minimization, the trigger circuit or a control circuit is to be integrated within the housing, with the electrical connection points having to be formed taking into account the work required for assembly and production.

In low-voltage systems, so-called N-PE-spark gaps are used for protection against surges between the N-conductor and the PE-conductor.

These spark gaps must have a very high surge arresting capacity of up to 100 kA 10/350 μs, in particular for protection from direct lightning strokes.

Encapsulated spark gaps having such a capacity are, for example, already known from DE 196 04 947 C1, DE 198 18 674 A1 or DE 298 10 937 U1. These spark gaps have a protection level of $\geqq$2.5 kV.

In certain applications, however, spark gaps having lower protection levels are required. For realizing these requirements, the use of trigger circuits is appropriate. Powerful N-PE-spark gaps also comprising an additional efficient trigger electrode at constant high capacity, are not yet available.

The high current load, the associated high burning away of material, the high dynamic loads caused by electric current forces, pressure, energy and temperature, pose considerable constructional demands for encapsulated arresters.

Surge arresters having coaxial electrode arrangements, which are advantageous in manufacture due to their rotational symmetry, are for example disclosed in EP 0 840 413 A1 or EP 0 771 055 A1. Therein, a bilaterally insulated electrode is guided through a tube which at the same time constitutes the outer electrode and the housing cover. The inclusion of an additional trigger electrode is not possible or only in a complicated manner. Moreover, an additional electrode would be arranged directly in the arc area, and would hence influence the arcing behavior and be subjected to a strong burning. According to DE 35 28 556 A1 or EP 0 242 688 B1, coaxial electrode arrangements are formed by a rod electrode projecting unilaterally into a tube electrode. In the cited solutions, the insertion of a third electrode is not provided, and can also be hardly realized. Moreover, there is the risk with the ignition in particular of arcs of high current or long duration that these exit from the coaxial electrode area and cause severe damage to the gap encapsulation. Existent cavities outside of the preferred arc chamber may not be used for pressure compensation or as an expansion chamber, since heat discharge to the insulation material of the chamber wall is extremely inefficient.

From U.S. Pat. No. 3,849,704 but also from DE 198 17 063 A1, encapsulated spark gaps having a coaxial electrode arrangement are already known.

According to DE 198 17 063 A1, the interelectrode distance increases with an increasing distance from the point of spark-over. Here, the target is to achieve an arc migration with an arc extension for increasing the quenching capacity in the follow current. The arc extension, however, forcibly leads to higher energy turnovers and major temperature and pressure loads, which, in particular in N-PE-spark gaps are unnecessary and moreover undesired.

The cited surge arresters likewise do not have a third electrode for triggering. Nor does the above cited prior art show an expansion chamber, in which the heated gas can be efficiently cooled down after or even during load application. Such a measure, however, is in particular essential for N-PE-spark gaps in an encapsulated form, since the pressure load, the arc voltage and consequently the energy turnover and the temperature load may be limited to a minimum.

On the other hand, an overvoltage protection system is known from DE 100 08 764 A1, featuring coaxial main electrodes that can be triggered. The connection of the electrodes is realized from the same side so as to effect within the discharge gap a directed movement of the arc towards a baffle.

This, however, results in an extension and division of the arc, whereby a quenching of follow currents is intended to be supported. As has already been explained, the extension of the arc is not purposeful for the N-PE-spark gap.

Moreover, the known spark gap has no suitable expansion chamber permitting the cooling down of hot gases. The high pressure developing thus causes an undesired increase of the arc voltage and causes unnecessary mechanical stress on the spark gap housing. A reduction of the pressure load can only be achieved by means of large outlet openings that are already efficient during the arc formation. However, there exists the risk of an undesired escape of electrically conducting gases.

DE-AS 12 82 153 discloses a spark gap having a so-called expansion chamber and a reflection chamber. The reflection chamber is intended to selectively press the arc into the expansion chamber by means of pressure arising during the arc ignition to protect the ignition point from-too high a burning, on the one hand, and for extending the arc, on the other hand, so that the quenching behavior of the spark gap is improved.

From the foregoing the object of the invention is firstly to provide an improved compact arrangement for multipole, surge-proof surge arresters comprising internally wired, encapsulated spark gaps which are arranged essentially in parallel in a housing and having a trigger circuit, which can also be used for a so-called 3+1 circuit and which can be produced in a particularly cost-efficient manner.

This part of the object of the invention is solved by a compact arrangement for multipole, surge-proof surge arresters according to the features of claim 1, with the dependent claims 2-18 providing at least purposeful configurations and further improvements.

Furthermore, it is an object of the invention to provide an improved encapsulated surge arrester with a spark gap arrangement, which can in particular be used as an N-PE-arrester in a compact arrangement. The surge arrester is intended to fulfill these essential requirements of high insulation capacity and a very high arresting capacity, and it should be possible for the surge arrester to be rendered triggerable by means of a third electrode.

This partial object of the invention is solved by an encapsulated surge arrester according to the features of claim 19, with the following dependent claims at least comprising purposeful configurations and further improvements.

According to a basic idea of the invention, a trough-shaped housing with inner dividing walls is provided, with the resulting housing chambers accommodating the individual spark gaps and the corresponding terminals.

An insulating plate with openings into which spring contact elements are introduced is provided on the upwardly opening housing trough.

Above said insulating plate is the wiring support for the electronic control or trigger circuit, whereby the spring contacts form an electrical connection between contact points on the underside of the wiring support on the one hand, and the outer covering of each of the spark gaps on the other hand.

Preferably the wiring support is a copper-clad circuit board, with the contact points on the underside of said circuit board formed as large-area solder lands.

Said circuit board comprises lateral, preferably offset connecting terminal lugs that can be electrically and mechanically connected to inner contact bars situated in the corresponding housing chambers. Thus, not only the desired electrical contact is achieved but also a mechanical locking of the insulation plate comprising the spring contact elements. Separate fastening means for the insulation plate itself may be omitted.

In the area of the openings, the underside of the insulation plate preferably features sleeve-like extensions cut at an angle to the longitudinal axis so that the spring contact elements, on the one hand, are secured from dropping out, and, on the other hand, a conductive portion thereof is exposed. In the non-cut lower area, the sleeve-like extension is closed to accommodate preferably cylindrical pressure springs, which on both sides of the corresponding openings are exposed or project, i.e. upwardly and downwardly beyond the cut portion.

If the encapsulated spark gaps have an essentially cylindrical shape, said cut portion of the sleeve-like extensions is formed like a circle segment and complementarily to the cylindrical spark gap housing.

Opposite each of the sleeve-like extensions, at least one other locking extension is formed on the insulating plate, which locking extension with its side facing the respective spark gap is adapted to the housing shape of same, so that the insulating plate aligns itself when being placed, thereby further simplifying assembly.

The upper side of the insulating plate features spacer cams formed thereon that rest against the underside of the circuit board. Undesired force effects acting upon the soldering points of the electronic components on the circuit board, as well as undesired tensions and forces acting upon the circuit board are thereby minimized. To this effect, said spacer cams are arranged distributed across the outer periphery of the upper side of the insulating plate.

The housing and the insulating plate are preferably injection-molded plastic parts, i.e. the insulating plate in particular is integrally formed with the sleeve-like extensions and the spacer cams.

A wiring plane change-over bridge provided for a 3+1 circuit essentially features a Z-shape with two short connection legs facing in opposite directions, and one longer connection leg, with the fastening and electrical contact being achieved by a fitting essentially based only on a form fit.

Existing contact surfaces projecting from the spark gaps are used to achieve the fastening and bonding of the wiring plane change-over bridge through these quasi bolts. The longer connection leg of the wiring plane change-over bridge may be provided with an insulation covering.

In the short legs, fitting bores or recesses are formed corresponding to the outer dimensions of each of the projecting contact surfaces of the spark gap.

Moreover, the material thickness of at least the short legs is essentially equal to or by a minor amount less than the height of the contact surface projection of each spark gap. The wiring plane change-over bridge is then arranged in the outer housing of the surge arrester so that the long leg extends in the spacing of the space between two of the spark gaps or between two chambers.

For internal connection and for accommodating outer terminals, the contact bars necessary for this effect are formed in one embodiment of the invention as metallic angular elements, with a first angle leg being non-positively connected with the corresponding projecting contact surface of the spark gap, and a form-fit support being provided in the housing by this leg. A second angle leg accommodates the mentioned outer terminals or serves for fastening same.

The first angle leg of the contact bars is connected with the corresponding contact surface of the spark gap by screw connections, with the therein provided internally threaded bore being used for this purpose.

The screw connection as mentioned before serves at the same time for securing the corresponding short legs of the wiring plane change-over bridge.

Consequently, no further screw connection or a similar contact measure for the change of the wiring plane, e.g. across the contact bars, is necessary.

In a three-phase arrangement of the multipole surge arrester with a neutral conductor, one of the contact bars connects three of the four spark gaps on one of the longitudinal housing sides. The contact bar provided on the opposite longitudinal housing side either is formed as a single bar per spark gap or as a contact bar that features insulating portions. This contact bar featuring in each case single contact bars or the insulating portions receives the terminals of the phase or neutral conductors.

For the PE-connection, a further contact bar is provided with at least one outer terminal that is connected with the fourth spark gap.

The wiring plane change-over bridge extends between the third phase spark gap and the neutral conductor spark gap and is there correspondingly electrically connected.

The wiring plane change-over bridge is preferably made of a conductive flat material, in particular copper.

As mentioned before, the chambers formed in the housing accommodate the spark gaps, with the longitudinal housing sides comprising grooves or slots serving to guide and fasten the contact bars.

One of the chamber walls may be formed to guidingly receive at least a partial portion of the wiring plane change-over bridge.

In the area of the short legs of the wiring plane change-over bridge, tongue-like elevations or projections are arranged or provided, which when assembled, form a counter-bearing facing the corresponding first angle leg of the contact bar so that extension forces of the wiring plane change-over bridge arising with a surge current, can be safely absorbed.

With the current flow resulting in a 3+1 circuit with a change of the wiring plane, the change-over bridge is arranged so that current-contingent electrical forces will compensatingly cancel each other out, a fact which constitutes another essential advantage of the invention.

Due to the fact that the contact of the wiring plane change-over bridge directly ensues at the spark gap stacks via bores in the bridge, no further additional mechanical connections are necessary. The preferred fitting and the additional securing of the fit clamping by means of the contact bars creates an optimal electrical and mechanical construction without increasing space and the outer dimensions of the housing of the multipole arrester being changed as a consequence.

The preferred stack arrangement of spark gaps in a first plane, an insulating plate arranged above, and the circuit board including an electronic circuit arranged above same advantageously reduces space as desired. The insulating plate thereby not only fulfills the function of electric insulation but also serves as the support element of preferably cylindrical pressure springs, which serve the purpose of electrically contacting or connecting the control or trigger circuit to the spark gaps present in the first plane. An outer cover then completes the overall arrangement and provides safety from contact and protection of the assembly.

In the surge arrester improved according to the invention, a coaxial construction of at least partially overlapping main electrodes is provided that have oppositely directed connections. The main electrodes include an arc chamber in conjunction with at least one insulation part.

According to the invention, at least one of the main electrodes has an inner expansion chamber, and a preferably radially or axially rotationally symmetrically extending trigger electrode is provided in the area of the insulation part.

Preferably, the first main electrode is formed as a rod electrode with a cavity, with the latter being in flow-side communication with the arc chamber through openings.

In the connection area of the second, hollow-cylindrically formed main electrode, a further expansion chamber is present.

The expansion chambers may feature a minimized pressure compensation opening, which is preferably formed in the area of the connections.

In one embodiment of the invention, the rod electrode, with its end distal from the connection, is centered and held within the surrounding second main electrode by a further insulation part.

The second insulation part has return channels up to the expansion chamber of the second main electrode.

Both expansion chambers can be in flow-side communication by at least one insulating channel.

By a variation of the radial distance between the coaxially arranged, partially overlapping electrodes, a corresponding response voltage may be selectively predetermined.

At least one of the electrodes has a shoulder or a stepped configuration directed towards the arc chamber for a stepped response behavior and a secure quenching capacity even in the case of triggering failing.

According to the invention, there exists the further possibility of forming the arc chamber to be divisible by a circumferential ridge mounted on the rod electrode.

On their surfaces facing the arc chamber, the main electrodes may have groove-shaped contours, ridges and/or cams for minimization of burning away.

The second main electrode surrounding the first main electrode may constitute an essential part of the encapsulation.

The first and/or second insulation part may feature at least one circumferential ridge for supporting sparking in air.

In one pressure-proof embodiment of the surge arrester, a quenching gas filling is preferably provided.

By the arrangement proposed according to the invention of two electrodes realized one in another in coaxial position and made of a burning-resistant material, having oppositely directed connections, with the main electrodes disposing of internal expansion chambers, a configuration develops permitting the inclusion of a rotationally symmetrical third, so-called trigger electrode. The overall arrangement has a high insulation capacity at a correspondingly high surge arresting capacity, and is therefore particularly destined for use as an N-PE-spark gap.

The invention will be described in the following by means of example embodiments and with reference to the Figures.

Figure 8:
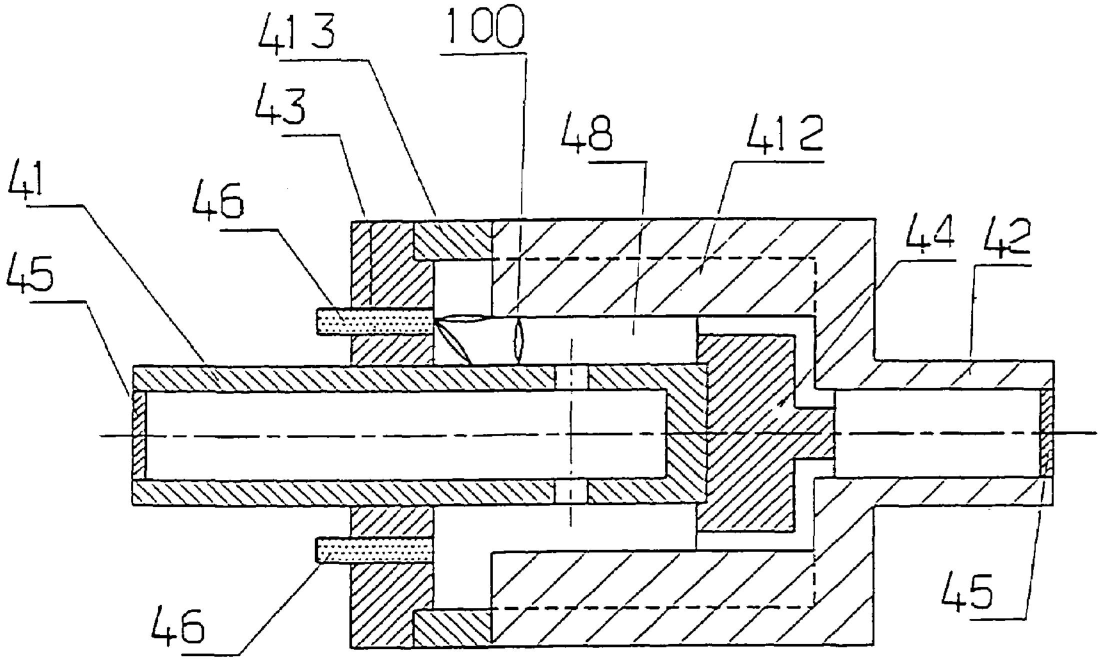
Figure 9:
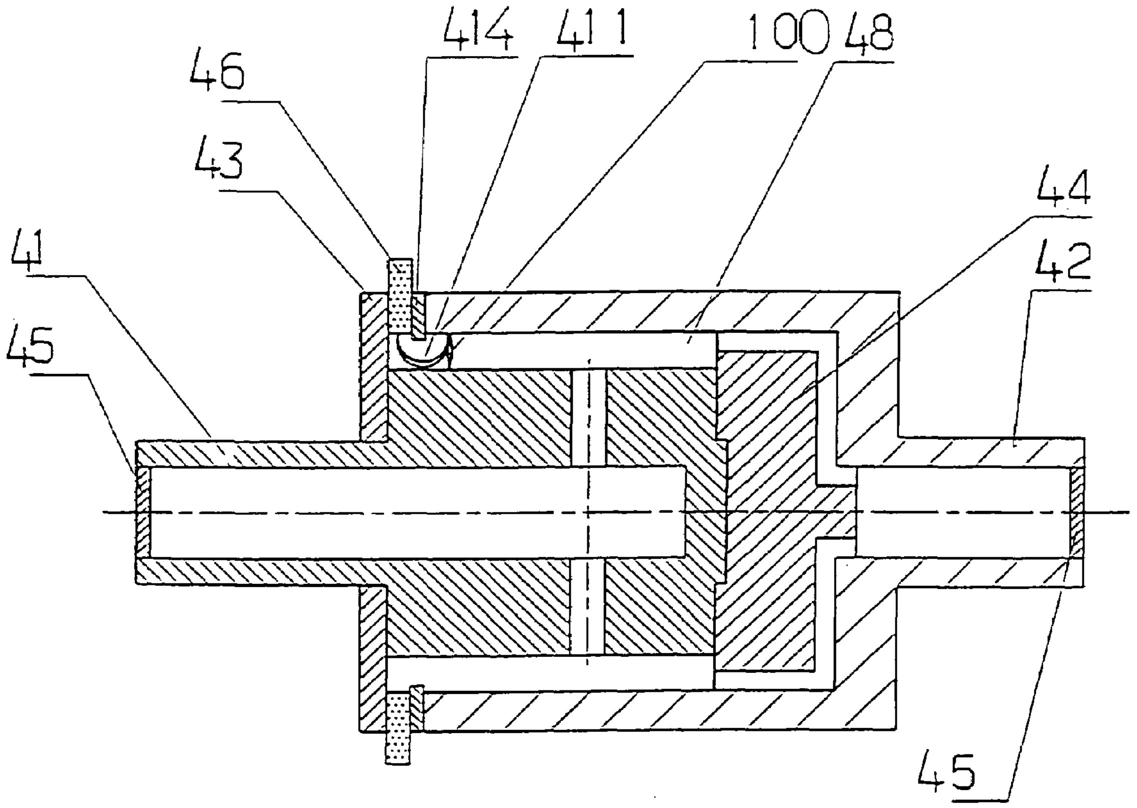

FIG. 8 shows a sectional view of a surge arrester including a stepped configuration of the second main electrode for reducing the distance in the entire arc chamber, and including an additional radial insulation gap for reducing burning away of in particular the trigger electrode; and FIG. 9 shows a sectional view of a surge arrester including a trigger electrode arranged adjacent to the second main electrode in axial direction.

Figure 1:
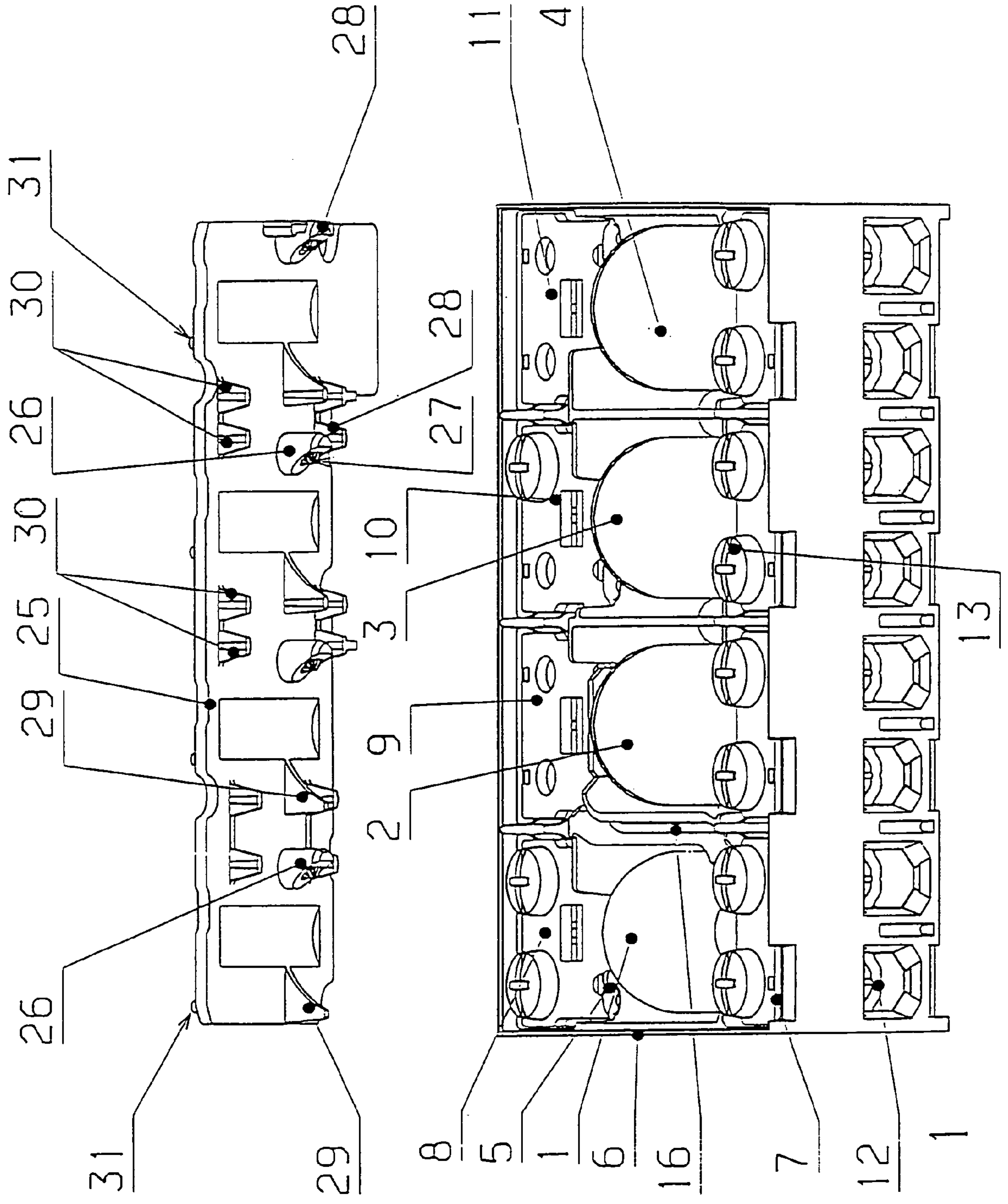
FIG. 1 shows a view of the trough-like housing including single chambers and spark gaps present therein, and the insulating plate not yet definitively positioned.

According to FIG. 1, chambers are provided in the plastic housing 6, which accommodate the surge arresters or spark gaps 1 through 4. Terminals 12 and fastening screws 13 can also be seen.

On the upwardly opening housing trough, an insulating plate 25 is placed that has several sleeve-like extensions 26 on its underside. These sleeve-like extensions serve to receive a cylindrical pressure spring 27 (cf. also FIG. 2).

In the spark gaps 1 through 4 in a form with a cylindrical metallic outer housing, said sleeve-like extensions 26 are cut or recessed in the shape of a circle segment, whereby a part of the cylindrical pressure spring 27 is exposed. The lower end portion 28 of the sleeve-like extensions 26 is closed, whereby the respective cylindrical pressure springs 27 are prevented from dropping out.

Hence, it can be seen from FIG. 1 that the cut portion of the sleeve-like extensions 26 is formed as a circle segment complementarily to the cylindrical spark gap housing.

Opposite each of the sleeve-like extensions 26, at least one further locking extension 29 is formed on the underside of the insulating plate 25 respectively. Further extensions 30 in the edge area of the underside of the insulating plate secure same against undesired displacement.

On the upper side of the insulating plate 25, spacer cams 31 are present formed on the outer edge area which in conjunction with the offset terminal lugs 32 present on the circuit board 33 prevent undesired tension forces from acting upon the soldering points for the electronic components on the circuit board 33 or upon the circuit board itself.

Figure 2:
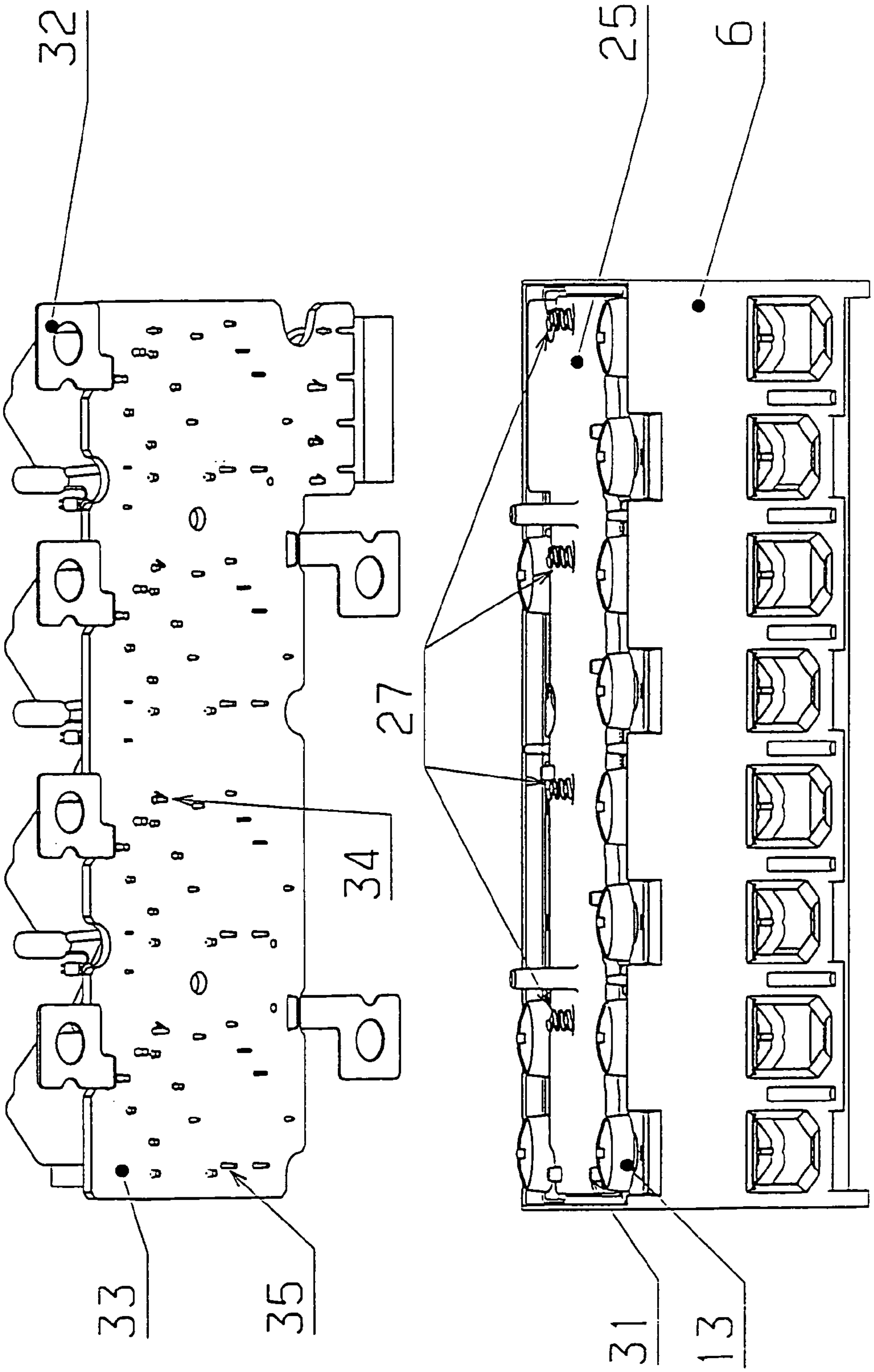
FIG. 2 shows a view of the arrangement with the insulating plate positioned and the circuit board arranged above not yet attached.

With reference to FIG. 2, the mentioned circuit board 33 is arranged above the insulating plate 25, whereby the upper ends of the cylindrical pressure springs 27 come into contact with specifically configured solder contact points on the underside of the circuit board so that an electrical connection towards the spark gaps is ensured.

The diameter of the contact points 34 is equal to or larger than the diameter of the cylindrical pressure springs or of the upper end of said contact spring 27. The typical flat cone shape of a solder point, in conjunction with the elasticity of the corresponding cylindrical pressure spring results in a centering and secure connection even when unavoidable tolerances with respect to the position and the embodiment of the terminal lugs 32 and their fastening by means of screws 13 are present.

Figure 5:
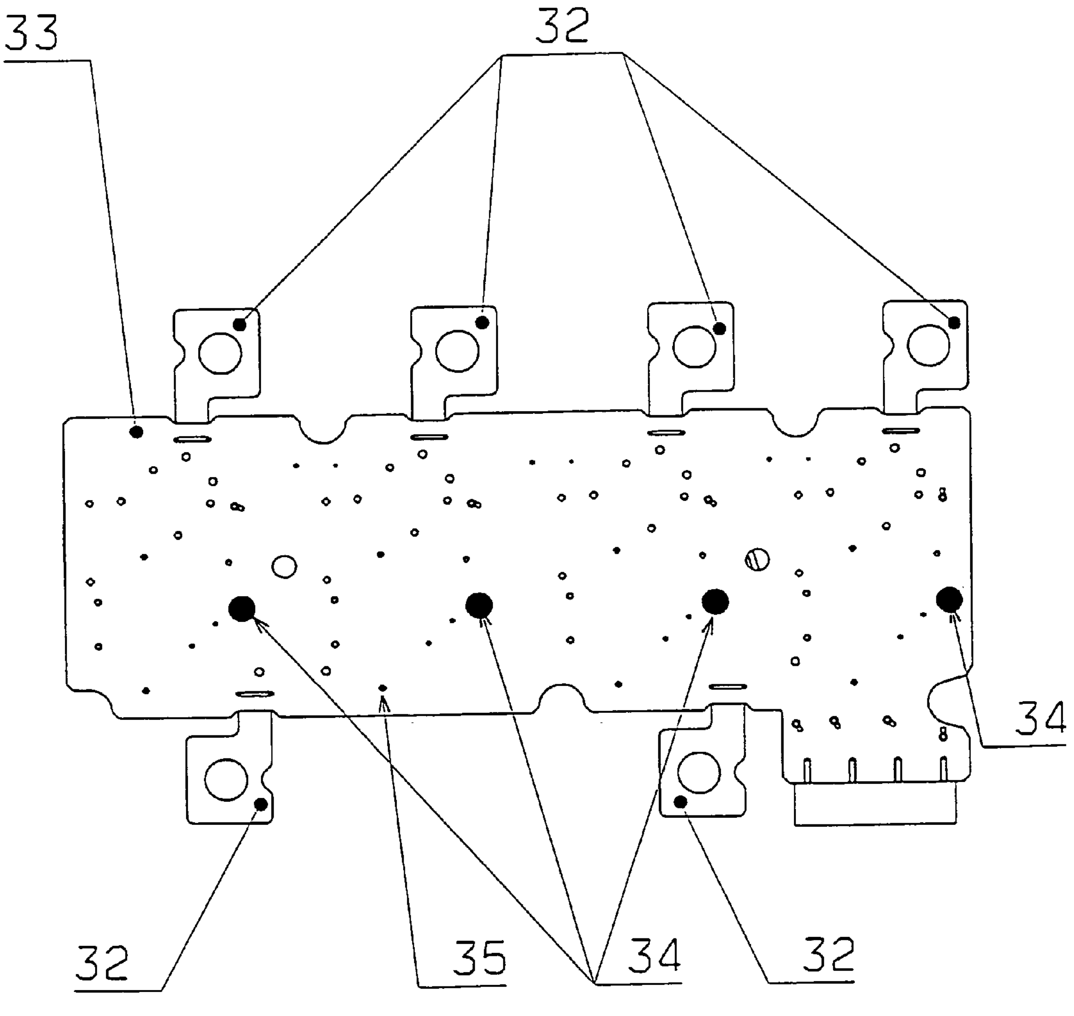
FIG. 5 shows a view of the underside of the circuit board of the control or trigger circuit including contact points of soldering lands.

The size ratios between the contact points 34, on one side, and remaining soldering lands 35 for fastening the electronic components on the circuit board 33 may be derived from FIG. 5, which also shows the laterally arranged terminal lugs 32.

In multipole surge arresters in a 3+1 circuit, the necessity arises with a correspondingly desired clamp connection for an internal change of wiring planes, for which purpose a corresponding bridge between one of the phases and the neutral conductor is required.

Figure 3:
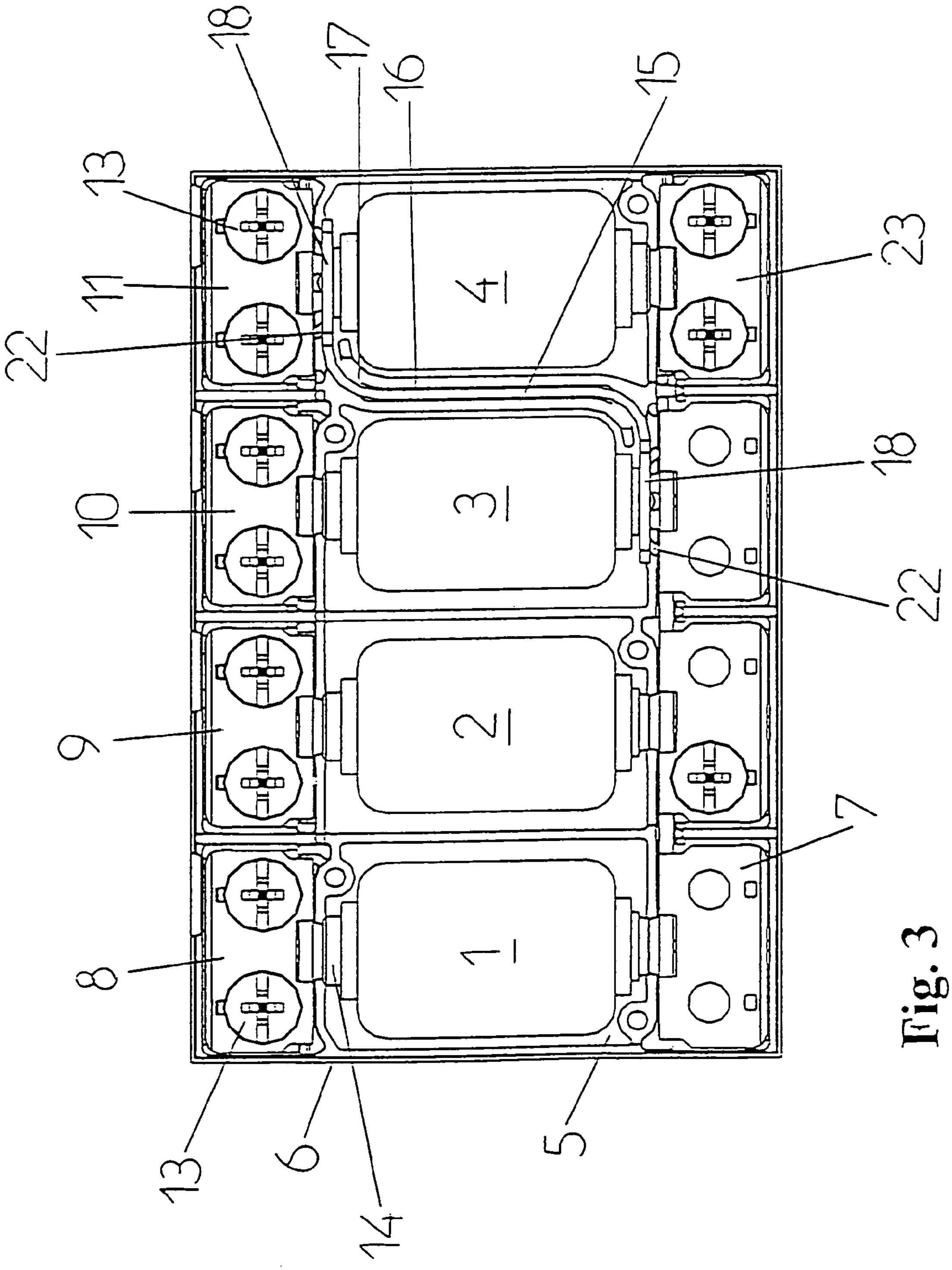
FIG. 3 shows a top view of a multipole surge arrester with visible spark gaps, contact bars and the wiring plane change-over bridge.

The practical realization of a multiple, surge-resistant surge arrester in a 3+1 circuit may be seen in FIG. 3. The individual surge arresters 1 through 4 are situated in individual chambers 5 of the plastic housing, with the contact bar 7 being provided on one of the longitudinal housing sides of the contact bar 7 which electrically connects the surge arresters 1 through 3.

On the opposite side of the housing 6, single contact bars 8 through 11 are provided. These single contact bars each receive a pair of outer terminals 12 (cf. also FIG. 4).

The contact bar 7 or the single contact bars 8 through 11 are electrically connected with a projecting contact surface 14 of the corresponding spark gaps 1 through 4 by a screw that is received by an internally threaded bore of the projecting contact surface 14.

The necessary wiring plane change-over bridge 15, which essentially has a Z-shape, is located between the surge arresters 3 and 4 with its longer connection leg.

In the example embodiment as per FIG. 3, a shaping 16 in the corresponding chamber dividing wall 17 is present for guidingly receiving at least the long leg of the wiring plane change-over bridge 15.

Figure 4:
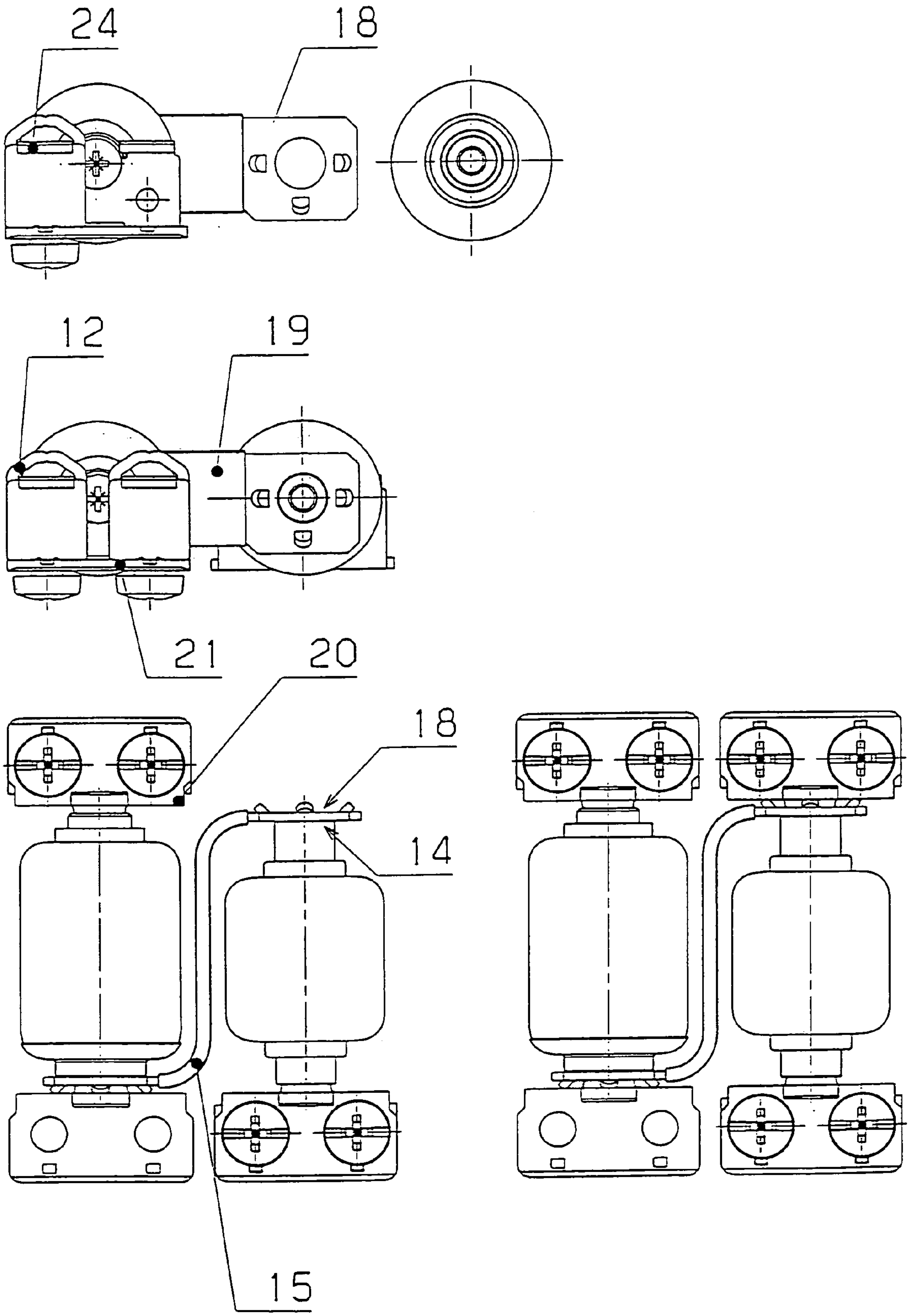
FIG. 4 shows details each of two surge arresters with a visible constructional mechanical arrangement of the wiring plane change-over bridge.

As can be particularly clearly seen from the upper part of FIG. 4, a fitting bore is formed in the short leg 18 of the wiring plane change-over bridge, which bore is adapted to the outer dimensions of the projecting contact surface 14 of the corresponding arrester 1 through 4.

Therewith, each short leg 18 can be brought into positive connection with the projecting contact surface 14, with the final fixation then being effected by means of a corresponding contact bar such as is apparent from the lower part of FIG. 4.

The material thickness at least of the short legs 18 is essentially equal to or less than the height of the contact surface projection 14 of each of the spark gaps 1 through 4.

Preferably the wiring plane change-over bridge 15 consists of a flat copper material, which can be provided with an insulation covering 19 (cf. FIG. 4) at least in a partial area.

The contact bar 7 but also the single contact bars 8 through 11 are formed as metallic angular elements, with a first angle leg 20 being in non-positive connection with the corresponding projecting contact surface 14 of the corresponding spark gap. Through this leg 20, a positive connection or a corresponding support can be achieved in the housing 6 which has corresponding grooves or similar recesses for this purpose.

A second angle leg 21 carries the terminals 12. The first angle leg 20 is connected with the corresponding contact surface 14 of the corresponding spark gap by a screw connection (cf. FIG. 4). This screw connection may simultaneously secure each short leg 18 of the wiring plane change-over bridge 15 such as it is illustrated on the lower right side in the image part according to FIG. 4.

Tongue-like elevations or projections 22 arranged or incorporated in the area of the short legs 18 of the wiring plane change-over bridge 15 when assembled face the corresponding first angle leg so that a counter-bearing develops which can absorb electrodynamic forces in case of a surge.

This counter-bearing in particular counteracts an extension of the bow when current flows.

With an essentially, at least in portions, U-shape of the contact bars 8 through 11 or 23 for the PE-connection, a third tongue angle leg 24 (cf. upper image part as per FIG. 4) serves as a pressure plate for the cable fixation. This third tongue angle leg 24 is essentially opposite the second angle leg 21.

FIGS. 6 through 9 have a first main electrode 41 and a second main electrode 42, with the electrodes having an electrical connection in the areas 45. This connection may, for example, be achieved by means of a screw connection.

Preferably, said first main electrode is formed as a rod electrode having a cavity 47 inside. This cavity 47 constitutes an inner expansion chamber.

Said cavity 47 is in connection with the arc chamber 48 by at least one opening 49.

The first main electrode 41 partially projects into the tubular area of the second main electrode 42 in a coaxial arrangement. Specifically, this overlapping area constitutes the desired coaxial structure.

By means of the pot-shaped form of the second main electrode 42, this can directly form a part of the encapsulation of the entire spark gap so that technological and also material savings are achieved.

To improve guidance and adjustment, it is possible to arrange an insulation part 44 between the first main electrode 41 and the second main electrode 42. This insulation part 44 then simultaneously axially delimits the arc chamber 48.

Preferably, the insulation part 44 has appropriate openings or through-flow channels 410 so that an additional cavity 47 within the second main electrode 42 is in communication with the arc chamber 48.

In order to achieve a complete encapsulation of the electrode arrangement and to further delimit the arc chamber, a (first) insulation part 43 is arranged between the first main electrode 41 and the open end of the main electrode 42.

A solution where the encapsulation is effected outside of the main electrode arrangement and where the arc chamber is not directly delimited by insulation parts is likewise within the scope of the invention.

The insulation part 43 features an additional third electrode for triggering the main gap between the first and second main electrode. This electrode or several electrodes 46 may be arranged in a rod shape, a pin shape but also in a ring shape.

In a preferred embodiment, a disk electrode is used which is aligned coaxially to the first and second main electrodes.

Preferably, said described spark gap is pressed or screwed with additional insulation in a pressure-proof metal housing.

The influence of force thereby takes place along the axis of symmetry. For decoupling to the highest degree the possible sparkover paths of the spark gap along the insulation parts 43 and 44 from the influence of force during the assembly process, these parts extend radially from the axis of symmetry. Thus, it is guaranteed that the influence on the response voltage of the spark gap, due to the assembly process as well as during thermal load of the pressurized insulation parts, remains slight.

The function of the arrangement will be explained in the following.

Upon triggering the spark gap, the trigger electrode 46 strikes one or several ignition sparks 411 to one or both of the main electrodes 41 and/or 42.

Thereupon, the arc 100 strikes between the main electrodes 41 and 42. In that case where the spark gap is formed without a trigger electrode 6, the arc 100 forms by a sliding discharge along the insulation gaps 43 or 44, or by sparking in air between the main electrodes 41 and 42.

After ignition, the arc 100 is present in the arc chamber 48 and may rotate about the first main electrode 41 within this chamber according to the coaxial arrangement. At the time of the arc ignition, overpressure develops within the arc chamber 48 by the gases present heating. This overpressure would lead to an increased mechanical load of the parts, and would in addition increase the arc voltage resulting in an unnecessarily high energy turnover within the spark gap and hence also in high thermal loads.

Also, the high heating of all parts in the arc chamber would complicate the quenching of the arc. For avoiding these negative phenomena, at least one additional cavity 47 is made available for the expanding gas within the spark gap as an expansion chamber, which is not directly exposed to the arc. After ignition of the arc, the heated gas may flow off through the mentioned openings or channels 40 and 410, respectively, into the expansion chamber 47. Due to the large volume, the high heat capacity and the large surface of the metal electrodes present in that chamber 47, the heated gas is immediately cooled down and depressurized.

Pressure increase, arc voltage and energy turnover within the arc chamber thus are limited to a minimum.

Figure 6:
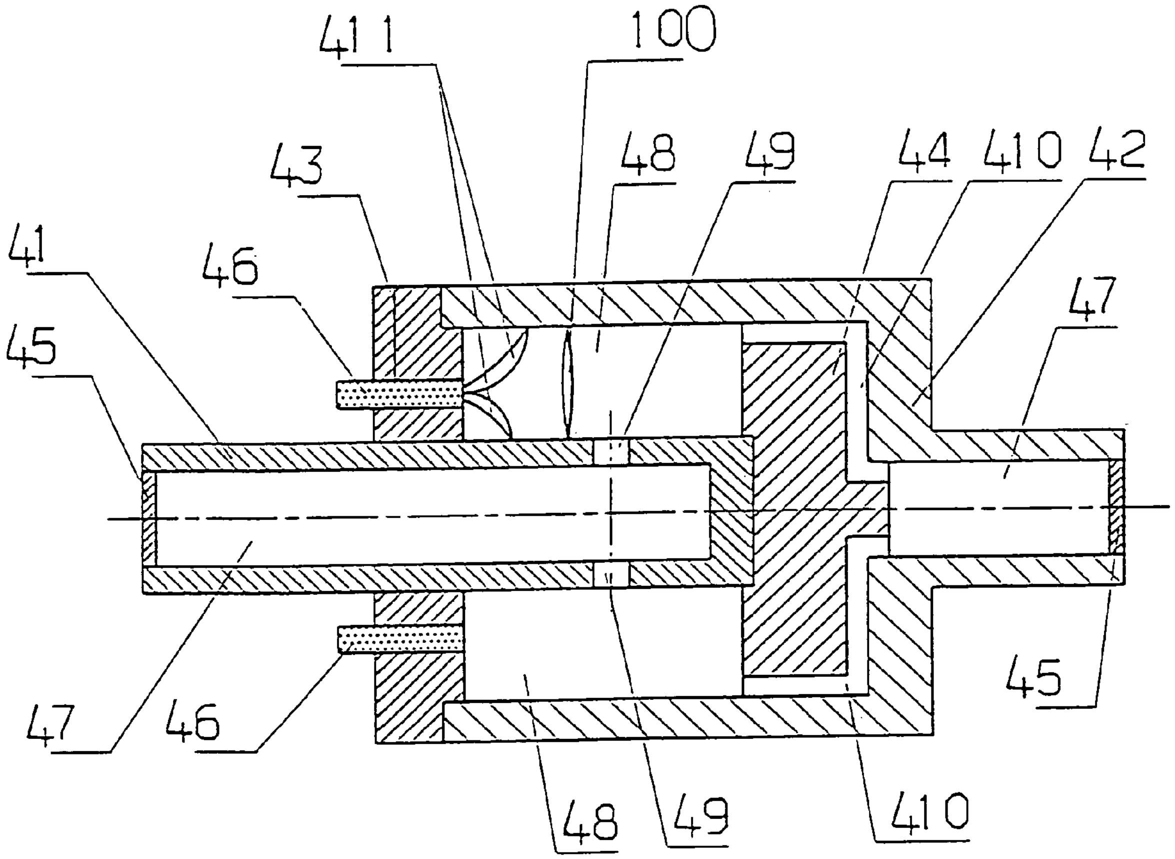
FIG. 6 shows a sectional view of a surge arrester having a coaxial electrode structure.

FIG. 6 shows an embodiment of separated expansion chambers 47. There is, however, the possibility of interconnecting the two chambers along the axis of symmetry by one or several channels which are insulated.

In the area of the connections 45 or in a location within the expansion chambers 47, the shown arrangement may in addition have minimal pressure compensation openings that after dying-out of the pressure load provide for a pressure compensation with the environment. This is then particularly advantageous when decomposition of the materials used and consequently a possible additional gas formation arises due to the arc influence within the spark gap. Due to the position and size of the pressure compensation openings, a fast pressure compensation in the range of milliseconds or a slow pressure reduction in the range of minutes may take place.

The arrangement according to FIG. 6 still requires a considerable energy input after the ignition spark forming between the electrodes 42 and 46, which only sparks over a partial gap of the overall arrangement due to the positioning of the electrodes 41, 42 and 46, until the entire spark gap between the electrodes 41 and 42 is ionized and a sparkover between the main electrodes may accordingly take place. The possibility of adapting this energy demand, however, advantageously permits the simple coordination of the PE-arrester with protection means arranged downstream.

By correspondingly designing the electrode arrangement as a whole, triggerable arresters with a high demand on triggering energy may thus be created, whereby a response of the main spark gap of the arrester only ensues at high-energy overvoltages.

The aforementioned renders the network less sensitive to disturbances and guarantees a better utilization of the capacity of downstream protection means.

On the other hand, however, an arrester may be created by a design of the electrode arrangements shown in FIG. 9, which responds already at extremely low-power overvoltages and which consequently may be used as a single device.

Should the trigger electrode 46 fail, the spark gap features rather high response values due to the centric arrangement of the trigger electrode 46 and the twofold insulation gap implied due to this fact.

Figure 7:
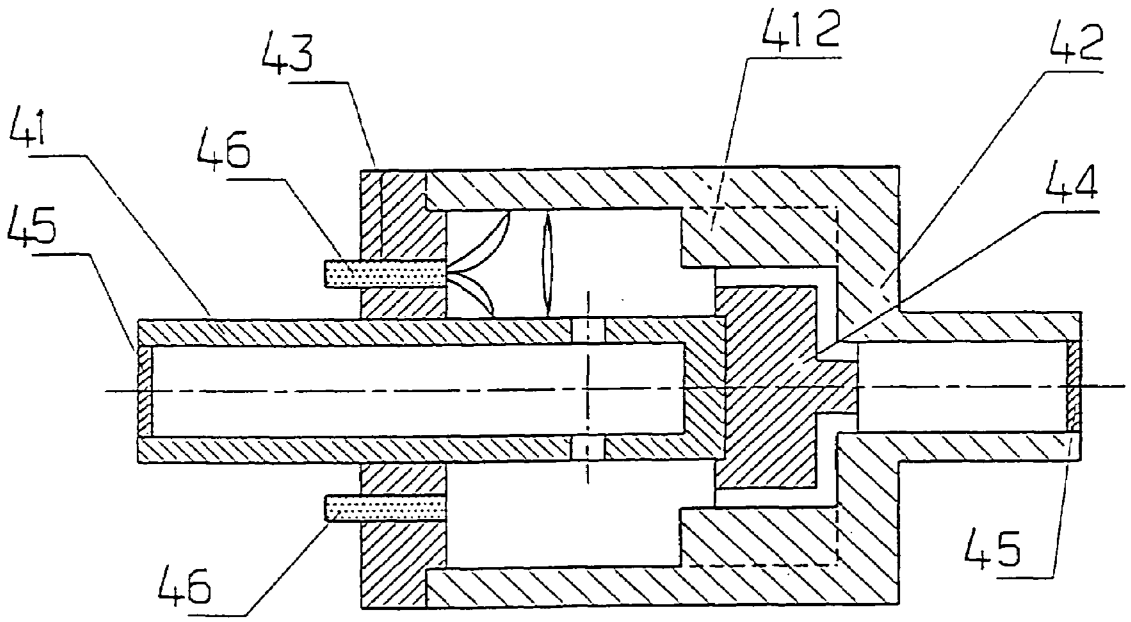
FIG. 7 shows a similar representation as disclosed in FIG. 6 but with a stepped configuration of one inner side of the second main electrode for creating a stepped response behavior.

In order to achieve here a certain emergency running property of the spark gap, the insulation part 44 according to FIG. 7 is shortened by a shoulder or a stepped configuration 412 inside the electrode 42. This has the effect that besides the spark gap controllable by triggering, a second, independent spark gap is available having a response voltage independent of the triggering, which response voltage is significantly lower in the triggering range than the response voltage of the sliding gap or air gap between the first and second main electrodes 41 and 42.

This construction results at the same time in the possibility of a stepped response behavior of the spark gap at different rates of voltage rise. This allows for a decoupling of the spark gap just at these different rates of voltage rise. At minor rates of rise, the spark gap is controlled by the trigger circuit and the corresponding trigger gap. Contrary thereto, an overhead ignition of the spark gap may be achieved at high rates of voltage rise, which overhead ignition is characterized in that the trigger unit of the spark gap itself remains uninvolved. The spark gap then ignites quasi automatically in the area of the stepped configuration 412, without the trigger unit being loaded.

Due to the attachment not shown of a high, circumferential ridge made of an insulation material on the first main electrode 41 in the arc chamber, this may be subdivided, and, more precisely, into an area with a trigger electrode and an area without a trigger electrode. This arrangement results in the advantage that in normal function mode only the arc chamber with the trigger electrode is loaded, and the other arc chamber remains unloaded, whereby in case of emergency, i.e. when the triggering fails, the desired emergency running properties may be guaranteed, since these arc chambers have not been impaired by burning, temperature or pollution up to just this given case of emergency. Such a function mode may also be achieved with two completely independent and separated arc chambers.

FIG. 8 shows a similar arrangement as FIG. 6, here, however, the shoulder or step extends so far that the spacing in the entire arc chamber 48 between the first and the second mains electrodes 41, 42 is distinctly reduced. By an additional axial insulation gap 413, the burning on the insulation part 43 and the trigger electrode 46 is moreover reduced, since a direct contact of these parts with the arc 100 may be avoided. Of course, said insulation gap 413 may also be provided independent of the shoulder 412 as in an embodiment as per FIG. 6.

FIG. 9 shows an arrangement where the trigger electrode 46 has been axially arranged downstream of the main electrode 42.

This arrangement ensures both the protection of the trigger electrode from excessive burning and a reduction of the response voltage without triggering. Furthermore, the required trigger energy may be reduced to a minimum with this arrangement. The ignition spark forming between the trigger electrode 46 and the second main electrode 42 during the response of the trigger circuit, in particular in case of an insulation part 414 minimally projecting into the arc chamber 48 and a minor distance of the main electrodes 41 and 42, may contact the first main electrode 41 already during its formation. Thereby, the insulation gap between the main electrodes 41 and 42 is abruptly bridged and the trigger energy is reduced to a minimum.

In the arrangement as per FIG. 9, a partial insulation of the main electrode 41 within the arc chamber 48 along the axis of symmetry and adjacent to the insulation parts 43 and 44 for protection from burning phenomena on each insulation parts or also on the trigger electrode may be appropriate.

For supporting the desired arc rotation and for avoiding too strong a deposit of melt material, one or several circumferential contours, e.g. as grooves or ridges mounted on top may be formed or incorporated into the main electrodes 41 and 42 within the arc chamber 48. Single cams may also be placed on top or other elevations for controlling the response voltage during sparking in air or for controlling burning behavior.

For supporting sparking in air, the insulation parts 43 and 44 may also be provided with at least one circumferential ridge (not shown) projecting into the arc chamber.

List of Reference Numerals

| | |
|---|---|
| 1 through 4 | surge arresters or spark gaps |
| 5 | chamber |
| 6 | plastic housing |
| 7 | contact bar |
| 8 through 11 | single contact bars |
| 12 | terminal |
| 13 | screw |
| 14 | projecting contact surface of the spark gap |
| 15 | wiring plane change-over bridge |
| 16 | shaping |
| 17 | dividing wall of the chamber |
| 18 | short leg of the wiring plane change-over bridge |
| 19 | insulation cover |
| 20 | first angle leg |
| 21 | second angle leg |
| 22 | tongue-like elevations or projections |
| 23 | PE-terminal |
| 24 | tongue angle leg |
| 25 | insulation plate |
| 26 | sleeve-like extension |
| 27 | cylindrical pressure spring |
| 28 | lower end portion of sleeve-like extension |
| 29 | locking extension |
| 30 | further extensions |
| 31 | spacer cams |
| 32 | terminal lug |
| 33 | circuit board |
| 34 | contact point |
| 35 | soldering lands |
| 41 | first main electrode |
| 42 | second main electrode |
| 43 | outer insulation part |
| 44 | inner insulation part |
| 45 | connections |
| 46 | trigger electrode |
| 47 | expansion chamber |
| 48 | arc chamber |
| 49 | openings |
| 410 | through-flow channels |
| 411 | ignition spark |
| 100 | arc |
| 412 | shoulder or stepped configuration |
| 413 | axially extending insulation part |
| 414 | inwardly projecting insulation part |

The invention claimed is:

1. A multipole surge-proof surge arrester comprising:

internally wired, encapsulated surge arresters essentially arranged in parallel in a housing, said encapsulated surge arresters including spark gaps and having facing projecting contact surfaces connected to outer terminals and inner contact bars or bridges, wherein the encapsulated surge arresters include an electronic control or trigger circuit present on a wiring support, wherein said housing is trough-shaped with dividing walls, the housing including chambers configured to accommodate the spark gaps and the outer terminals, an insulating plate is provided on the trough-shaped housing, said insulating plate including openings configured to receive spring contact elements, and the wiring support is arranged above said insulating plate, with the spring contact elements configured to form an electrical connection between contact points on an underside of the wiring support and a cover of one of the spark gaps, respectively.

2. The multipole surge-proof surge arrester according to claim 1, wherein the wiring support is a copper-clad circuit board, and the contact points are large-area solder lands.

3. The multipole surge-proof surge arrester according to claim 1, wherein the wiring support is a circuit board, the circuit board comprises lateral terminal lugs configured to be electrically connected to the inner contact bars, and the insulation plate including the spring contact elements is configured to mechanically lock with the housing.

4. The multipole surge-proof surge arrester according to claim 1, wherein in an area of the openings, the underside of the insulation plate comprises sleeve-like extensions cut at an angle to the longitudinal axis so that the spring contact elements are secured from dropping out, and a conductive portion of the spring contact elements are exposed.

5. The multipole surge-proof surge arrester according to claim 4, wherein the spark gaps are essentially cylindrical-shaped, said cut portion of the sleeve-like extensions configured to be formed in a circle segment and complementarily to cylindrical housing of the cylindrically-shaped spark gaps or a corresponding housing part.

6. The multipole surge-proof surge arrester according to claim 1, wherein the spring contact elements are cylindrical pressure springs which project on both sides of a corresponding opening.

7. The multipole surge-proof surge arrester according to claim 5, further comprising:

a locking extension provided to face said sleeve-like extension, wherein a side of the locking extension facing a corresponding spark gap is adapted to a shape of the housing of the corresponding spark gap.

8. The multipole surge-proof surge arrester according to claim 1, wherein an upper side of the insulation plate has spacer cams formed thereon.

9. The multipole surge-proof surge arrester according to claim 1, wherein the housing and the insulation plate are injection-molded plastic parts.

10. The multipole surge-proof surge arrester according to claim 1, further comprising:

an essentially Z-shaped wiring plane change-over bridge connecting two projecting contact surfaces, said change-over bridge including two short, oppositely directed connection legs and one longer connection leg, with fitting bores or recesses formed in the short legs, which correspond to an outer dimension of the projecting contact surfaces, with a material thickness of at least the short legs being essentially equal to or less than a height of a projection of a contact surface of the spark gap, and the long leg extends in a space between two of the spark gaps.

11. The multipole surge-proof surge arrester according to claim 10, wherein the inner contact bars are formed as metallic angular elements, with a first angle leg configured to be non-positively connected with a corresponding projecting contact surface of the spark gap, a form-fit support provided in the housing by the first angle leg, and a second angle leg configured to accommodate the outer terminals.

12. The multipole surge-proof surge arrester according to claim 11, wherein the first angle leg is connected with a corresponding contact surface of the spark gap by a screw connection.

13. The multipole surge-proof surge arrester according to claim 12, wherein the screw connection simultaneously secures a respective short leg of the wiring plane change-over bridge.

14. The multipole surge-proof surge arrester according to claim 10, wherein in a three-phase arrangement including a neutral conductor, one of the contact bars connects three of four spark gaps, with the one contact bar provided on a facing longitudinal housing side including insulating portions or an interruption, the one contact bar configured to accommodate the terminals of a first, second, and third phase conductor and the neutral conductor, another contact bar having at least one outer terminal configured to be connected with the fourth spark gap for a PE-connection, and the wiring plane change-over bridge configured to form an electrical connection between the spark gap of the third phase conductor and the spark gap of the neutral conductor.

15. The multipole surge-proof surge arrester according to claim 10, wherein the wiring plane change-over bridge consists of a conductive flat portion made of copper.

16. The multipole surge-proof surge arrester according to claim 10, wherein one of the dividing walls of the chambers is configured to receive at least one partial portion of the wiring plane change-over bridge.

17. The multipole surge-proof surge arrester according to claim 10, further comprising:

tongue-like elevations or projections arranged in an area of the short legs of the wiring plane change-over bride, said tongue-like elevations configured to form a counter-bearing and to face the corresponding first angle leg.

18. The multipole surge-proof surge arrester according to claim 11, further comprising a tongue angle leg configured to face the second angle leg and to form a pressure plate for cable fixation.

19. An encapsulated surge arrester comprising:

a spark gap arrangement including two coaxially arranged and at least partially overlapping metallic main electrodes with oppositely directed connections, the main electrodes configured to form an arc chamber in conjunction with an outer insulation part, wherein at least one of the main electrodes is rod shaped and has an inner expansion chamber, and a radially or axially rotationally symmetrically extending trigger electrode is provided in an area of the outer insulation part.

20. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and the first main electrode is formed as a rod electrode having a cavity in flow-side communication with the arc chamber through openings.

21. The encapsulated surge arrester according to claim 20, wherein a further expansion chamber is provided in a connection area of the second main electrode, the second main electrode being a hollow-cylindrically formed main electrode.

22. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and the inner expansion chamber includes a minimized pressure compensation opening formed in an area of the connections.

23. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and the first main electrode is a rod electrode, with an end distal from the connection, that is centered and held within the surrounding second main electrode by an inner insulation part.

24. The encapsulated surge arrester according to claim 23, wherein the inner insulation part includes through-flow channels directed towards the expansion chamber.

25. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and the expansion chamber is in communication with another expansion chamber through at least one insulating channel.

26. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and a corresponding response voltage is predetermined by a variation of a radial distance between the coaxially arranged, partially overlapping first and second main electrodes.

27. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and at least one of the first and second main electrodes has a shoulder or a stepped configuration facing the arc chamber for a stepped response behavior and a secure quenching capacity even if triggering fails.

28. The encapsulated surge arrester according to claim 20, wherein the arc chamber is divided by a circumferential ridge mounted on the rod electrode.

29. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and the first and second main electrodes, on surfaces facing the arc chamber, have groove-shaped contours, ridges or cams.

30. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and the second main electrode is configured to surround the first main electrode and to constitute a part of an encapsulation of the surge arrester.

31. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, the first and second main electrodes are made of a burn-resistant material including one of tungsten-copper and graphite, and the outer insulation part is made of a gas-emitting plastic.

32. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and a first insulation part includes at least one circumferential ridge configured to support sparking in air.

33. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and the surge arrester is configured to have a pressure-proof configuration including a quenching gas filling.

34. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and the arc chamber is configured to be formed by a pressure-proof connection by a force of pressure or a force generated by a screw such that acting forces are directed along an axes of symmetry.

35. An encapsulated surge arrester comprising:

a spark gap arrangement including two coaxially arranged and at least partially overlapping metallic first and second main electrodes with oppositely directed connections, the first and second main electrodes configured to form an arc chamber in conjunction with an outer insulation part, wherein at least one of the first and second main electrodes has an inner expansion chamber, a radially or axially rotationally symmetrically extending trigger electrode is provided in an area of the outer insulation part, and the arc chamber includes a N-PE-spark gap.

36. The multipole surge-proof surge arrester of claim 1, wherein the encapsulated surge arrester includes two coaxially arranged and at least partially overlapping metallic main electrodes having oppositely directed connections, with the main electrodes forming an arc chamber in conjunction with an outer insulation part, and at least one of the main electrodes has an inner expansion chamber, and a radially or axially rotationally symmetrical extending trigger electrode provided in the area of the outer insulation part.

* * * * *